US008209254B2

(12) United States Patent
Setz et al.

(10) Patent No.: US 8,209,254 B2
(45) Date of Patent: Jun. 26, 2012

(54) AUTOMATED TRADING SYSTEM (75) Inventors: Karen Ilse Setz, Tarrytown, NY (US); Snezhana Malkin, Morris Plains, NJ (US); Leong Fai Mah, Bridgewater, NJ (US); Steven J. Scully, Chatham, NJ (US); Tracey Riordan, Bernardsville, NJ (US); Edward R. Howorka, Morris Plains, NJ (US); James Sinclair, New York, NY (US)

(73) Assignee: EBS Group Limited, London (GB)

( * ) Notice: Subject to any disclaimer, the term of this patent is extended or adjusted under 35 U.S.C. 154(b) by 1887 days.

(21) Appl. No.: 10/202,827

(22) Filed: Jul. 26, 2002

(65) Prior Publication Data

US 2004/0019553 A1 Jan. 29, 2004

(51) Int. Cl.
*G06Q 40/00* (2006.01)
(52) U.S. Cl. .............. 705/37; 705/35; 705/36 R; 705/39
(58) Field of Classification Search ............. 705/37, 705/26, 36 R, 38, 35, 39
See application file for complete search history.

(56) References Cited

U.S. PATENT DOCUMENTS

| 4,412,287 A | 10/1983 | Braddock, III |
| 4,674,044 A | 6/1987 | Kalmus et al. |
| 4,677,552 A | 6/1987 | Sibley, Jr. |
| 4,799,156 A | 1/1989 | Shavit et al. |
| 4,903,201 A | 2/1990 | Wagner |
| 4,980,826 A | 12/1990 | Wagner |
| 5,077,665 A | 12/1991 | Silverman et al. |
| 5,305,200 A | 4/1994 | Hartheimer et al. |
| 5,715,402 A | 2/1998 | Popolo |
| 5,727,165 A | 3/1998 | Ordish et al. |
| 5,787,402 A | 7/1998 | Potter et al. |
| 5,805,798 A | 9/1998 | Kearns et al. |
| 5,873,071 A | 2/1999 | Ferstenberg et al. |
| 5,924,083 A | 7/1999 | Silverman et al. |
| 5,950,177 A | 9/1999 | Lupien et al. |
| 6,014,643 A | 1/2000 | Minton |
| 6,058,379 A | 5/2000 | Odom et al. |

(Continued)

FOREIGN PATENT DOCUMENTS

EP 0 434 224 A2 11/1990

(Continued)

OTHER PUBLICATIONS

U.S. Appl. No. 09/821,518.

*Primary Examiner* — Behrang Badii
(74) *Attorney, Agent, or Firm* — Dickstein Shapiro LLP (57) ABSTRACT

A computer trading system includes a quote screening function configured to accept quotes specifying a quote amount in a price where the quote amount is greater than a minimum quote amount to produce screen quote messages and to reject quotes specifying a quote amount less than the minimum quote amount. A market view generator generates market views from those quotes which specify an amount greater than or equal to the minimum quote amount. An order screening function only accepts orders specifying an amount less than a maximum transaction amount submitted in response to the market views to produce screened order messages. A transaction processor receives screened quote messages and screened order messages and matches appropriate messages with each other. The minimum quote amount is substantially equal to or greater than the maximum transaction amount whereby a screened order message can be matched entirely with one screened quote message.

10 Claims, 6 Drawing Sheets

U.S. PATENT DOCUMENTS

| | | |
|---|---|---|
| 6,247,000 B1 | 6/2001 | Hawkins et al. |
| 6,260,025 B1 | 7/2001 | Silverman et al. |
| 6,282,521 B1 | 8/2001 | Howorka |
| 6,405,180 B2 | 6/2002 | Tilfors et al. |
| 6,691,094 B1* | 2/2004 | Herschkorn .................. 705/37 |
| 2001/0032163 A1* | 10/2001 | Fertik et al. .................. 705/37 |
| 2004/0143542 A1* | 7/2004 | Magill et al. .................. 705/37 |
| 2007/0233595 A1* | 10/2007 | Nordlicht et al. ............. 705/37 |
| 2008/0027851 A1* | 1/2008 | Brady et al. .................. 705/37 |

FOREIGN PATENT DOCUMENTS

| | | |
|---|---|---|
| EP | 0 952 536 A1 | 10/1999 |
| EP | 0 776 505 B1 | 4/2000 |
| EP | 1 067 471 A1 | 1/2001 |
| EP | 1 104 904 A1 | 6/2001 |
| EP | 0 873 549 B1 | 8/2001 |
| EP | 1 128 294 A1 | 8/2001 |
| WO | WO 98/49639 | 11/1998 |
| WO | WO 99/19821 | 4/1999 |
| WO | WO 00/22548 | 4/2000 |
| WO | WO 00/68846 | 11/2000 |
| WO | WO 00/68857 | 11/2000 |
| WO | WO 00/77708 A1 | 12/2000 |
| WO | WO 01/01274 A2 | 1/2001 |
| WO | WO 01/02930 A2 | 1/2001 |
| WO | WO 01/04813 A1 | 1/2001 |
| WO | WO 01/08072 A1 | 2/2001 |
| WO | WO 01/22337 A2 | 3/2001 |
| WO | WO 01/27848 A2 | 4/2001 |
| WO | WO 01/39068 A1 | 5/2001 |
| WO | WO 01/45007 A1 | 6/2001 |
| WO | WO 01/54037 A1 | 7/2001 |
| WO | WO 01/54039 A2 | 7/2001 |

* cited by examiner

AUTOMATED TRADING SYSTEM

FIELD OF THE INVENTION

This invention relates to an automated trading system. In particular, the automated trading system allows subscriber parties to buy and sell instruments in a single transaction up to a predefined maximum value. Typically, but not exclusively, the automated trading system may be used to enable spot foreign exchange dealing with a maximum transaction value of approximately 1 million currency units (e.g. $1 million, in the case of USD/JPY and EUR 1 million in the case of EUR/USD)

BACKGROUND OF THE INVENTION

In the financial exchange market, smaller and regional banks frequently conduct foreign exchange deals for small amounts of currency, for example up to approximately 1 million units, (so-called "smalls" transactions) with larger or global banks. When dealing with transactions of this type, the party wishing to buy or sell the currency (the "market user") has to obtain "quotes" for current bid and/or offer prices from a number of larger players ("market makers") who deal in that particular currency in order to try to obtain an optimal price. The market user responds to a quote by submitting an "order" to buy or sell. If the market user is not prepared to conclude the transaction immediately, he cannot guarantee that a particular quote will remain valid whilst he checks with other market makers to try to locate the best deal. We have appreciated that a considerable volume of direct dealing conducted on a daily basis is smalls transactions. The number of market users conducting these deals and the number of deals transacted per day is high. Although the amount generated by such smalls business is generally only a relatively small proportion of the overall business conducted by market makers, it requires a larger proportion of dealer time than some larger value business transactions. This makes the known trading systems inefficient. The transaction process is time consuming and inefficient for the market makers who have to respond to a large number of requests for bid/offer prices on an ad hoc basis and only achieve a modest amount of business on such smalls transactions compared to their overall turnover. The overhead per transaction for both the market users and market makers is therefore high and the satisfaction rate low.

U.S. Pat. No. 5,375,055 teaches a computerized trading system for trading of financial instruments between traders trading at a plurality of trading floors. The trading system provides for composite transactions where, in order to fulfill a taker deal, the transaction is executed between the taker and a plurality of makers. For small value trades, this system becomes impractical, requiring complicated and unnecessary processing.

We have appreciated the problem of encouraging submission of quotes for trading whilst avoiding the technical difficulty of increased unwanted message flow.

SUMMARY OF THE INVENTION

The automated trading system of the present invention aims to overcome or ameliorate these disadvantages.

The invention resides in two broad aspects. First, constraints are placed on the amount of an instrument that can be specified in a quote or an order. This is used to encourage trading whilst avoiding the generation of too many quote or order messages which could not match, unnecessarily degrading performance of the system.

Second, users are categorised and constraints placed on the matching of quotes and orders depending upon the categorisation of the user. This again encourages trading whilst preventing unwanted matching between certain categories of user, which again could degrade performance of the system.

The invention thus resides in providing an automated trading system for simplifying the execution of limited value transactions between parties subscribing to the system.

It further resides in providing an automated trading environment using an automated trading system to execute transactions valued below a maximum transaction value between subscriber parties located in different geographical locations and using different computer equipment and network connections.

More specifically, in the first aspect the invention resides in a computer trading system for trading instruments between counterparties of the type in which quotes to bid or offer instruments are matched with orders to buy or sell instruments, comprising:

a quote screening function configured to accept quotes specifying a quote amount and a price where the quote amount is greater than a minimum quote amount to produce screened Quote Messages, and to reject quotes specifying a quote amount less than the minimum quote amount;

a market view generator configured to generate market views from those quotes which specify an amount greater than or equal to the minimum quote amount;

an order screening function configured to only accept orders specifying an amount less than a maximum transaction amount submitted in response to the market views to produce screened order messages; and a transaction processor configured to receive screened Quote Messages and screened order messages and to match the screened order messages with appropriate screened Quote Messages.

Preferably, in the first aspect the minimum quote amount is substantially equal to or greater than the maximum transaction amount, whereby a screened order message can be matched entirely with one screened Quote Message. This ensures that any order to buy/sell can be completed in a single transaction with a matching quote to bid/offer.

Preferably, in the first aspect the market view generator is arranged:

to modify each screened Quote Message when an order message is matched therewith by decrementing the amount specified in each screened Quote Message; and to remove each screened Quote Message from the market views when the amount specified in each screened Quote Message is less than the minimum quote amount.

This feature further ensures that, as quotes are matched, only quotes which can match with an order in a single transaction remain available.

A further preferred feature in the first aspect is that the order screening function is further configured to segment an order specifying an amount greater than the maximum order amount into a first reduced value order specifying an amount which is less than the maximum order amount to produce a screened order message and at least a second reduced value order. This feature ensures that any order entered can be matched, at least in part, with a quote in a single transaction, thereby increasing transactions whilst avoiding flows of non-matching quote/order messages.

Preferably, in the first aspect the transaction processor is configured:

to store screened Quote Messages in a quote available store;

to decrement the amount specified in a given screened Quote Message in the quote available store each time a screened order message is matched therewith; and to remove the given screened Quote Message from the quote available store when the amount specified in that given screened Quote Message falls below the minimum quote amount.

This ensures, together with features discussed above, that only Quote Messages which can be matched with order messages in a single transaction are made available in the system.

In the second aspect of the invention, the invention resides in a computer trading system for trading instruments between parties of the type in which quotes to bid or offer instruments are matched with orders to buy or sell instruments, comprising:

a user parameter store arranged to store a user category parameter specifying whether each party is categorised as a market maker or market user; and a transaction processor arranged to prevent parties categorised as market users from submitting quotes.

The invention offers market makers and market users the opportunity to earn from the "smalls" market where banks are less price sensitive and to do this with minimal dealer intervention. It also offers market makers the opportunity to turn nuisance business into revenue generating activity and market users the ability to cover small amounts quickly and conveniently in conveniently sized units, whilst avoiding degrading system performance.

BRIEF DESCRIPTION OF THE DRAWINGS

Embodiments of the present invention will now be described with reference to the accompanying drawings of which.

DESCRIPTION OF BEST MODE

In a limited value, or "smalls", transaction system, a number of parties wish to trade instruments. The embodiment of the computer trading system which will now be described enables spot dealing of foreign currencies. In this description the terms computer trading system or automated trading system are used to describe the system as a whole. The term "trading system" is used to refer to a subset of the whole system. It will be immediately apparent that the invention could be used to trade any instrument where the maximum transaction value for a single transaction is limited.

Before the functional elements of the automated trading system and their location are described in detail, a brief overview of the computer trading system will be given.

Transaction prices are determined by market makers who offer to sell currencies at "bid" prices and/or offer to buy currencies at "offer" prices (jointly termed "quote prices"). The bid and offer prices are specified by currency pairs, for example GBP/USD. The market makers may specify bids and/or offers for any number of currency pairs by submitting suitable "quotes". Quotes include at least a quote price, an amount indicating the value of the instrument that they are prepared to deal, and preferably include data identifying the currency pair and transaction type. Parties wishing to use the automated trading system will be required to subscribe to the service provider. Market makers may be entitled to subscribe free to the automated trading system whilst market users (or takers) would be charged a standard fee for their subscription and also charged per transaction (corresponding to a brokerage fee). Subscribing parties are categorised as market makers or market users depending on whether they are making the market or merely trading at prices set by the market Makers. Additionally, a subscribing party may be categorised as both a market maker and a market user and may be allowed both to submit quotes to the trading system and react to submitted quotes in an attempt to execute a transaction.

Market makers are typically large banks but may, for example in the case of specialist markets, be a smaller or small bank responsible say for making the market in a niche currency. Market users similarly are typically smaller or small banks but may be individual companies or large banks trading in an under used instrument. Market users do not set the prices of bids and/or offers available via the automated trading system but only react to those prices submitted to the system by market makers.

An important aspect of the automated trading system is that a maximum transaction amount for a single transaction is rigidly imposed. Typically the maximum transaction amount is set at a value of 995,000 currency units (eg United States Dollars or USD). A market maker submitting a quote must indicate how many currency units he is prepared to trade at the quote price (the "quote amount"). Quotes offered by market makers are only used by the system as a whole if they are associated with an amount which is at least as large as the minimum quote amount which is preferably substantially equal to the maximum transaction amount imposed by the automated trading system. Thus, at least one transaction with a market user is possible for each market maker price seen by a market user. There is, therefore, never a requirement for the automated trading system to "work the balance", that is to find a second Maker to pick up an outstanding amount of a single transaction. Market makers who submit quotes specifying a higher amount benefit when a number of transactions are executed without any intervention from a dealer at the market maker. Preferably, the minimum quote amount specified in a quote accepted by the automated trading system is 1 unit larger than the maximum transaction amount imposed by the system. Typically, the minimum amount acceptable in a quote is 1,000,000 dollars.

Transactions are indicated by market users submitting an order specifying an amount and identifying an instrument and price which together specify the deal that they wish to enter into. If a market user tries to initiate a transaction for more than the maximum transaction amount accepted by the automated trading system, the order request may be handled by the system in one of three ways. Firstly, the system may simply reject the order request outright. Secondly, the system may segment the order request into a first portion specifying an amount less than or equal to the maximum transaction amount, match the first portion with the appropriate market maker quote and reject a second portion specifying the remaining amount. Thirdly, the system may operate as described above in the second manner except that instead of summarily rejecting the second portion, it may either try to match that portion with the same or another market maker quote or pass the second portion to a subsidiary system for possible automatic processing. The system may be configured to restrict matching of the various portions of the oversize order to a single market maker quote thereby constraining all the component parts of the single oversize order to be transacted between a single market maker and the market user.

The automated trading system is equipped with a credit management system which ensures that market users are only able to view prices from market makers with whom they are authorised to enter into transactions. Authorisation to enter into transactions is monitored by way of bilateral credit ratings maintained by a credit management system. When sufficient bilateral credit is available between market user/market maker counterparties, the market maker=s price quote is included in the generation of a market user specific Market User View. This reduces instances where a market user Dealer views a price which he is unable to obtain.

Figure 1:
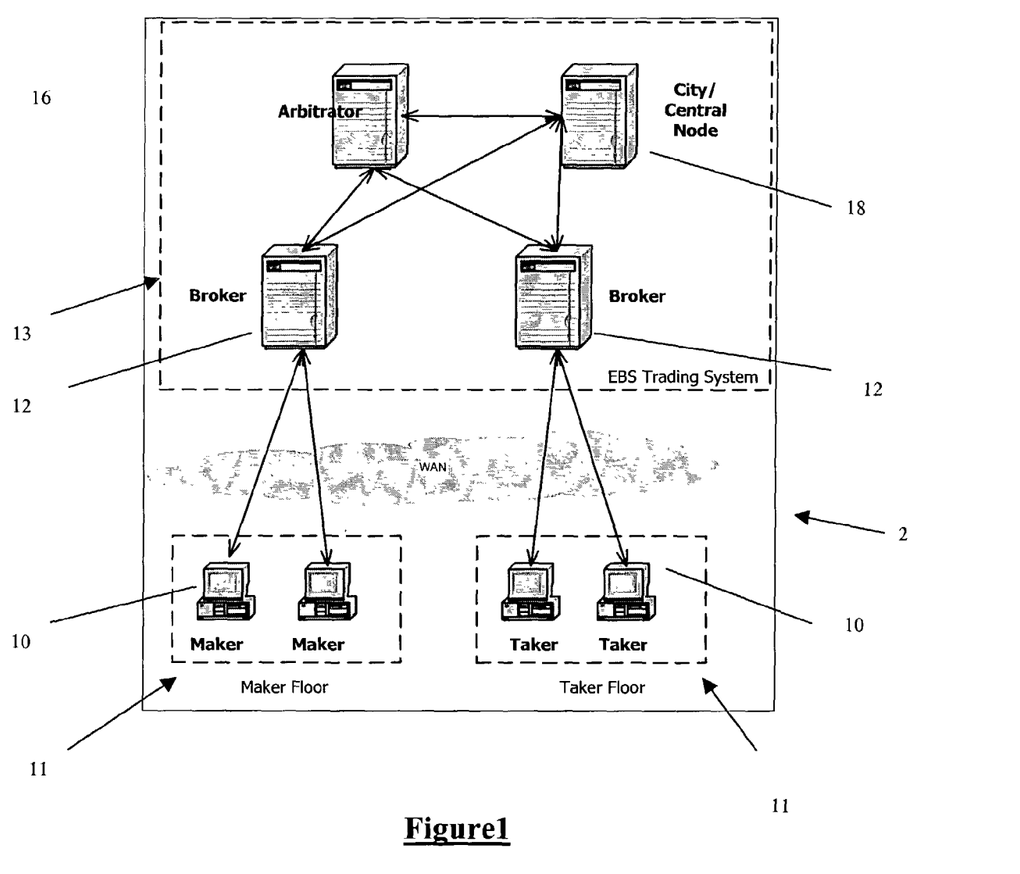
FIG. 1 is a logical diagram of a computer trading system embodying the invention.

In the computer trading system incorporating a preferred embodiment of the invention, the system functionality is split over a number of separate, but interconnected, logical components indicated in FIG. 1. A brief description of the interconnection of the various components within the computer trading system follows. Details of the functionality of the automated trading system and where the various functionality resides in the automated trading system is described later.

The computer trading system 2 provides a plurality of workstations 10 at trading floor 11 of the various market maker and market user parties subscribing to the service provider operating the trading system. The workstations of a trader are bi-directionally coupled to a trading system 13. The trading system 13 is that part of the whole computer trading system which deals with matching of quotes and orders and distribution of market views and includes at least one Broker Node (BN) 12. Broker Nodes 12 are physically hosted by the respective party and may hold proprietary information not for general circulation to other subscribers of the automated trading system. All communication between the automated trading system and market maker and market user workstations is routed through the appropriate Broker Node 12.

A BN 12 is typically a dedicated client side computer under control of a client floor administrator. A BN 12 maintains transaction records, credit limit information for any number of parties with whom the subscriber is prepared to trade and any other confidential information associated with the trading floor. A market maker BN 12 accepts submitted quotes. Under the control of the central city node 18, a BN 12 imposes restrictions on the type of data message that may be passed to and received from the automated trading system, for example, by preventing market users from submitting quotes.

The service provider defines cells covering specific geographic locations Each separate geographic location is provided with a City Node (CTY) (here shown combined with the central node for simplicity). A CTY acts as an information router. Broker nodes are bi-directionally coupled via a suitable network to the appropriate CTY. Thus a CTY may communicate with a plurality of Broker Nodes 12 but a Broker Node communicates with only one CTY.

The automated trading system is provided with at least one Arbitrator Node (ARB) 16. For simplicity, only one ARB 16 is shown in FIG. 1 and the following description assumes that a single ARB 16 is provided. The function of the ARB 16 is to perform high level processing of data originating from a plurality of Broker Nodes 12 covering a plurality of cells and to distribute this information across the automated trading system. The ARB 16 is therefore coupled via a suitable network to the plurality of Broker Nodes 12 and to the plurality of CTYs.

A central node (CNL) 18 is also provided in the trading environment. The CNL 18 is bi-directionally coupled to the ARB 16 and indirectly coupled to the Broker Nodes 12 via the network of CTYs 14. The CNL stores information on the system parameters of the automated trading system.

Figure 2:
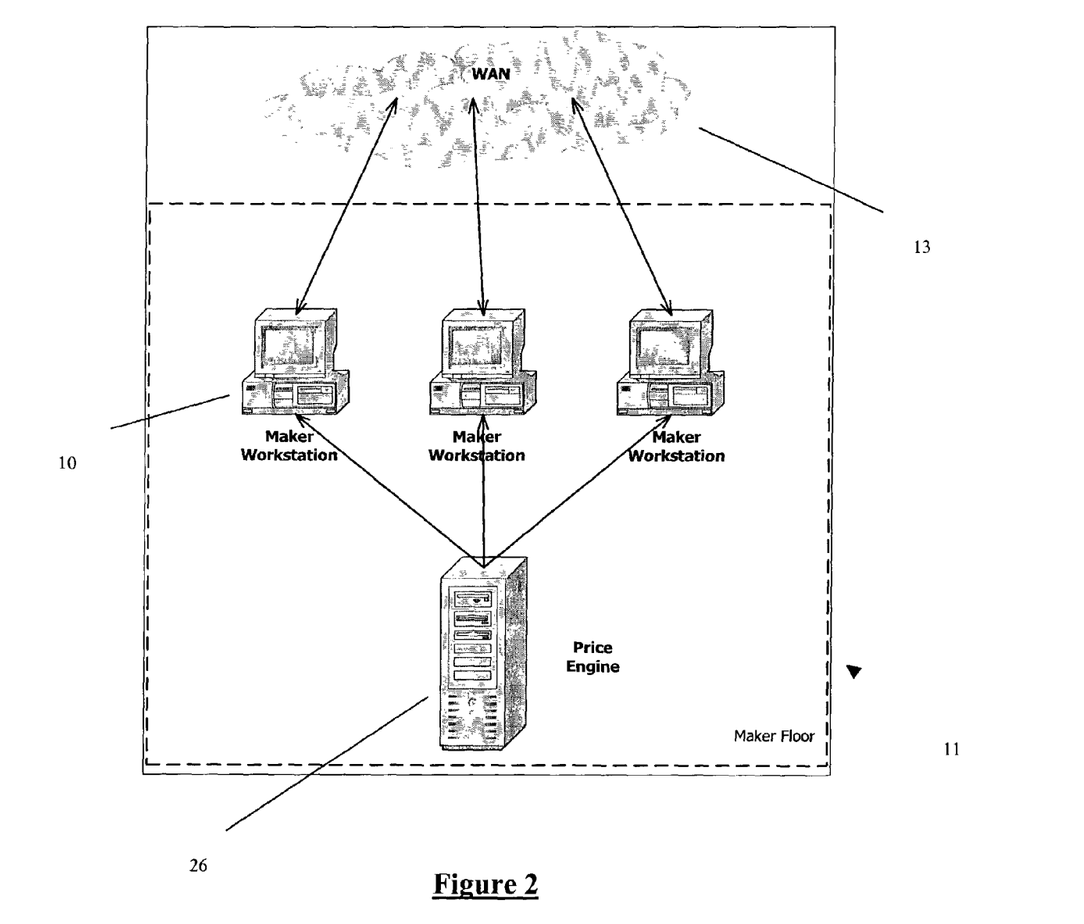
FIG. 2 is a logical diagram of a maker floor of the computer trading system.

FIG. 2 shows the logical elements of a maker floor. A trading floor comprises a number of workstations 10 logically connected together so as to provide traders of a particular concern (e.g. bank) to trade with traders at other trading floors (typically other banks). In this case, the trading floor is categorised as being for makers, that is for traders that submit quotes.

In addition to manually submitting quotes, a price engine 26 is provided which allows prices to be fed from other systems and to be converted to quotes at workstations 11. The actual implementation of the conversion of price feeds to quotes is not required to be discussed herein. It is simply noted that some workstations at maker trading floors 11 may have this functionality and that this will be used as part of user categorisation discussed later. The quotes derived from prices at the workstations are provided to the trading system 13 as previously described, but may be identified as being automatically derived from a price feed.

Figure 3:
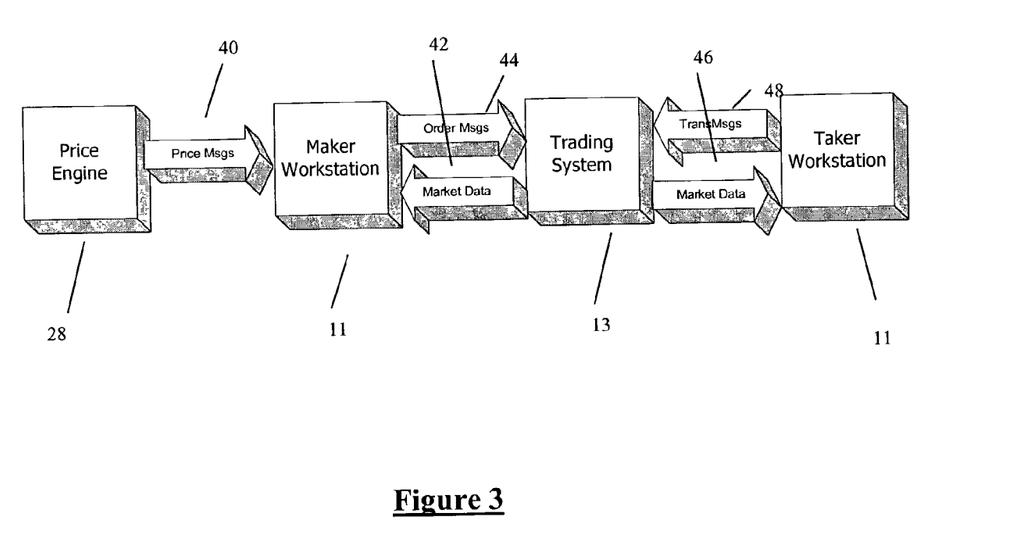
FIG. 3 is a logical diagram of the computer trading system showing message flow.

FIG. 3 shows the overall message flow between separate logical components. The price engine 26 of a maker trading floor provides prices messages 40 to a workstation designated as a maker workstation 11. The price messages are then converted to quotes at the maker workstation and are transmitted to the trading system 13 as quote order messages 44. The trading system provides market data 42, 46 to maker and taker workstations in the whole system providing market views. The market views include prices of the instrument to be traded and also an instrument type where the system can trade more than one instrument. In response to a price of quote displayed in a market view, a trader at a taker workstation may submit an order, which is transmitted to the trading system 13 as a transaction order message.

Figure 4:
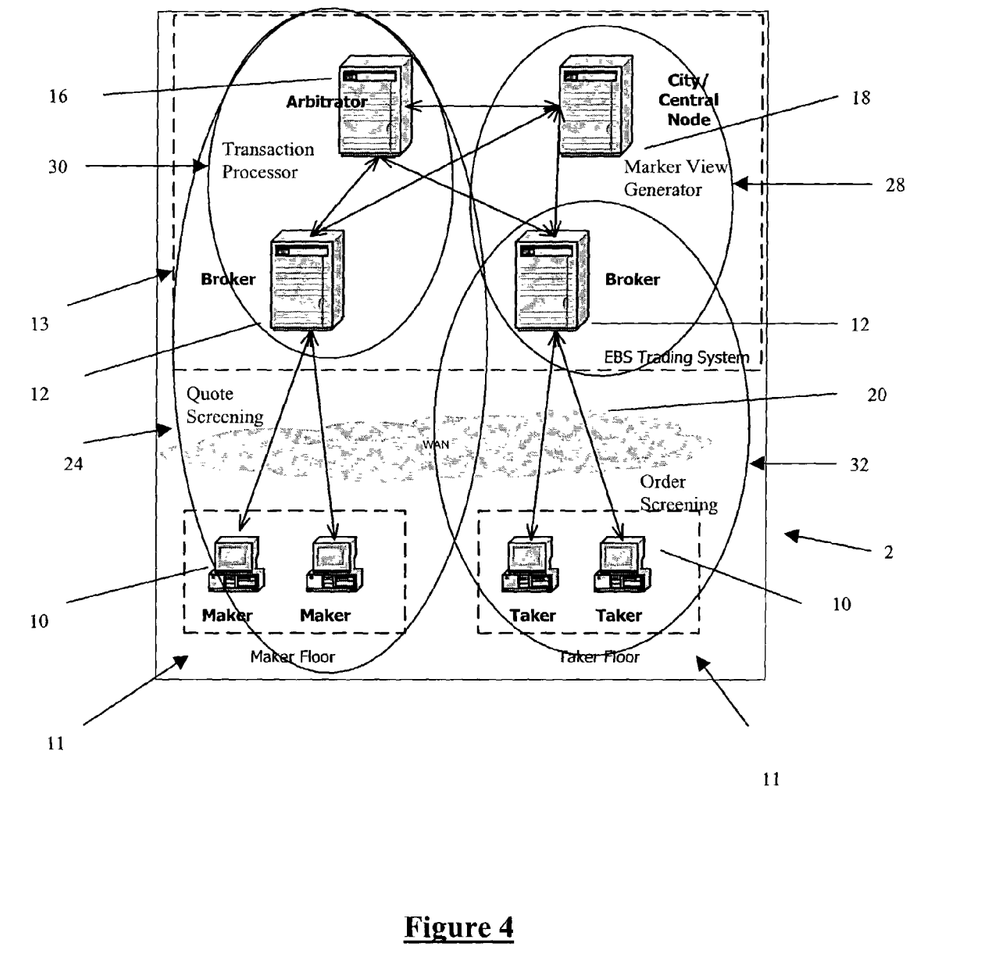
FIG. 4 is a logical diagram of the computer trading system showing the key functional components.

FIG. 4 is intended to aid description of the functional elements of the automated trading system. The various functional elements are, in the presently preferred embodiment, distributed between, and in some cases over, the various components shown in FIG. 1.

In FIG. 4 market maker and market user subscribers to the automated trading system connect to a communication network 20 via Broker Nodes 12 to which the trader workstations 10 are coupled. The network may be a Virtual Private Network (VPN), LAN or WAN or the Internet, World Wide Web. The trading system 13 is connected to the network 16 at a point in the network which is conceptually between the market user workstations and the market maker workstations.

The functional elements of automated trading system 22 include quote screening means (for example a quote screening function 24), market view means (for example a market view generator 28), matching means (for example a transaction processor 30) and order screening means (for example order screening function 32).

Communication of all prices from market makers to market users occurs through and is controlled by the trading system 13 part of the whole computer trading system 2. Routing of signals to and from functional elements (and to and from the network 20) is controlled by the trading system 13.

The automated trading system 13 receives data signals or "Messages" from market maker workstations and market taker workstations. These signals are fed to the appropriate functional elements, or components, of the trading system where they are processed and appropriate responses are communicated to the market makers and market users via the network.

Details of the functional elements of the automated trading system will now be described in more detail.

Quote Screening Function

The quote screening function 24 receives all quotes submitted to the automated trading system. The purpose of the screening function 28 is to screen all quotes and to reject quotes specifying an amount which is lower than the minimum quote amount imposed by the automated trading system. Quotes specifying an amount equal to or greater than the minimum quote amount are passed as screened Quote Messages from the screening processor to the market view generator. As soon as the specified amount associated with a quote in the screened Quote Message falls below the minimum quote amount, the Quote Message is rejected. This may occur from the outset if the quote submitted by the market maker initially specifies an amount less than the minimum quote amount or may occur after one or more transactions have been executed such that the amount has been decremented to take account of any executed transactions and in doing so has fallen below the minimum quote amount.

The functionality of the quote screening function is provided by the workstation which receives the quote provided by a trader on a direct feed and conducts the initial check that the quote satisfies the minimum quote amount. The functionality of the quote screening function is also provided by the broker nodes 12 which verify that the minimum quote amount is met. The CNL 18 provides for configuration of system parameters such as the type of trading floor (whether a particular party is a market maker, a market user or both), the minimum amount for which quotes will be accepted (which may be more than the maximum transaction amount but will not be less than the maximum transaction amount) and maximum transaction amount itself. These parameters define the scope of transactions permitted by the automated trading system. Data signals containing the parameter for the minimum quote amount are communicated to the ARB 16 from the CNL 18. The ARB 16 monitors the size of the amount specified in each Quote Message and removes a Quote Message if and when the amount falls below the minimum quote amount. Thus the ARB also provides some quote screening functionality.

When a Quote Message is rejected by the quote screening processor, the ARB communicates a Quote Rejection Message to the market maker Broker Node (MBN) responsible for the Quote Message. The MBN generates an error message which is used to alert the floor administrator that a quote has been rejected by the automated transaction system because the amount specified in the quote was below the minimum quote amount set by the automated trading system.

The screening processor 24 may additionally normalise all Quote Messages to ensure that they conform to the automated trading system standard. Normalisation may be performed before or after screening the quote to confirm that the specified amount is greater than the minimum quote amount. Normalisation is achieved by recognising different formats for the same transaction type and instrument and converting the data to a standard format.

Market View Generator

The function of the market view generator 28 is to generate, for each market user, a Market user View which is communicated to the market user over the network. The market view generator 28 is coupled to the quote screening function 24. Market User Views must include enough information for the market user to decide whether or not he wishes to deal on the specified terms. The Market User Views may be market maker prices or alternatively, could be more sophisticated indicating for example how far a market maker price is from a given price.

Only Quote Messages which specify an amount of at least minimum quote amount which is greater than the maximum transaction amount (whether manually entered by a market maker dealer or automatically generated) are communicated to the market view generator 28 by the quote screening function 24. Hence, the Market User Views only include prices which are valid for transactions of at least the minimum quote amount on hence the maximum transaction value. This in turn means that the automated trading system is never required to "work the balance" of a transaction because at least one transaction is possible for each Screened Quote Message received by the market view generator 28. Any trade executed by the automated trading system will, therefore, be conducted between a single maker and a single market user.

The functionality of the market view generator 28 is provided by the ARB 16 in conjunction with bi-lateral credit information held at both market maker and market user Broker Nodes 12 which is communicated to the ARB 16. The generated Market User Views are distributed to the respective market users by the CTYs 18.

The market view generator is preferably configured to generate for each market user a Customised Market User View. Customisation may take account of the subscription type of the market user. For example, one subscription type may entitle market users to view an anonymous price for a smalls deal whilst another type of subscription may entitle market users to view the prices of a number of market makers with details of which price is being quoted by which market maker. This requires two types of Market User View, Dealable Prices and Executable Price Lists. Both are generated by the price feed generator.

A "Dealable Price" is the best price for the particular instrument/trade type (ie buy or sell) being offered by any market maker. Preferably the Dealable Price is restricted to the best price for the particular instrument offered by a market maker with whom the market user is authorised to transact. A Dealable Price Message does not contain any information regarding the market maker offering the price and is, therefore, anonymous.

To generate a Dealable Price, the market view generator compares quote prices provided in Quote Messages for an instrument and selects the best price. The Dealable Price is communicated to the respective market user workstation where it is displayed.

The market user workstation may be capable of displaying Dealable Prices for a number of different currency pairs. A market user dealer may select, from a list on the display, which currency pair Dealable Price he wishes to view. The market user sees only one Dealable Price per transaction type. A market user may, for example, view one Dealable Price each for buying GBP/JPY, selling GBP/JPY and for buying USD/JPY and will see a total of 3 Dealable Prices.

As Quote Messages specifying an amount less than the minimum quote amount and hence the maximum transaction value are rejected, at least one market user will theoretically be able to complete a transaction at any Dealable Price. All smalls transactions conducted using the automated trading system will be conducted between two parties in a single hit transaction.

The automated trading system may be configured to provide market users who regularly conduct large amounts of smalls transactions access to prices for a certain currency pair from a number of market makers as shown in FIG. 3. The market users for whom this service is available are identified by the market view generator 28 causing the market view generator 28 to generate an Executable Price List by incorporating a number of the prices rather than selecting the best price.

Transaction Function

The transaction function 30 is configured to receive Order Messages submitted to the automated trading system 22 by market users wishing to initiate a trade at a price quoted by a market maker. It resides at the ARB 16 and matches market user Order Messages to market maker Quote Messages. In conjunction with the market maker and market user Broker Nodes 12 of the relevant counterparties, it verifies and completes the trade.

It is possible that several Order Messages are received from one or more market users in response to a single Quote Message and that the total transaction amount of all the Order Messages would exceed the amount specified in the Quote Message. If this is the case, the automated trading system 10 recognises that there are conflicting Order Messages. It selects one or more Order Messages for execution. A warning is sent to market users of the remaining Order Messages that the quote price was withdrawn prior to their Order Message being processed.

Order Messages which are selected may ultimately result in a trade being executed between the market maker and market user counterparties and the trade being recorded by the automated trading system 22. The transaction function may, or may not, execute further checks on the credit status of one or both parties before it finally clears a matched Order Message and Quote Message for a trade execution. Once a transaction has been executed, Transaction Confirmation Messages are generated by the transaction processor and communicated to both the market maker and market user counterparties. Details of the transaction may be printed at the market maker and market user. The bilateral credit between the counterparties is amended as necessary and the amount specified in the Quote Message of the market maker is decremented by the amount of the executed trade. The adjusted Quote Message is rescreened and rejected if the amount specified has fallen below the minimum quote amount.

The automated trading system 22 may also store a limit on the number of deals per day for a market maker with a particular market user, a maximum market maker credit limit for each market user and/or a maximum market maker debit limit for each currency pair and any appropriate running totals. When a running total reaches the maximum credit limit, the transaction processor 30 may prevent execution of a transaction between the two parties.

The ARB 16 performs the function of the transaction function, matching market maker Quote Messages with market user Order Messages.

Order Screening Function

The amount specified in an order is constrained to be below a maximum transaction amount. Initially this function is provided by the market user workstation.

The value of trades permitted by the automated trading system may be also constrained to discrete values, for example, the minimum trade may be 5000 units and trades sizes of 5000 units intervals only (i.e. 10,000, 15,000 etc.) may be allowed. These detailed system parameters are stored by the CNL and accessed as required by, or transferred to, the ARB 16. The ARB 16 rejects Order Messages which request a trade of an unsupported amount. If a submitted Order Message is unsupported by smalls, for example if the size of the trade is greater than the maximum trade size supported by the smalls system or if the size of the transaction specified is a non-standard size it is advisable that the market user is alerted. The ARB 16 generates an error message which is communicated to the particular market user BN to alert the market user floor administrator, or particular work station user that the automated trading system cannot accept the Order Message.

In an alternative embodiment, the automated trading system may be configured to process partial amounts of Order Messages where the amount specified is greater than the maximum transaction value of the Smalls System. In such an embodiment, the Aoversized@ Order Message (specifying an amount greater than the maximum transaction amount) is segmented into two or more reduced value Order Messages, one or more of which may be matched with an appropriate Price Message and executed.

For example, if the maximum transaction value is $1,000,000 and the amount specified in a particular Order Message is $1,500,000 the oversized Order Message may be segmented into a first reduced value Order Message specifying $1,000,000 and a second reduced value Order Message specifying $500,000. The first reduced value Order Message would then be matched with an appropriate Quote Message and the reduced value transaction of $1,000,000 executed between the market user submitting the oversize Order Message and a market user whose Quote Message is indicated.

The second reduced value Order Message may then either be rejected and the market user notified that that portion of his Order Message was rejected or, if the system allows, the second reduced value Order Message may be matched with a Price Message to result in a second transaction for the remaining $500,000. The second transaction will also be conducted in a single deal but may have a different market maker if the system allows.

The automated trading system may be set up such that the transaction function only allows the component parts of an oversize buy/or sell order indicated by an oversize Order Message to be transacted between a single market maker and the market user. Any components which would exceed the amount specified by the market maker in his Quote Message would then be rejected. There would be no opportunity for the remaining components to be transacted between the market user and one or more different market makers.

It will be obvious to one skilled in the art that an oversize Order Message specifying an amount more than two or more times greater than the maximum transaction value could be further segmented. Where segmentation of an oversize Order Message is permitted by the automated trading system, the functionality is performed by the transaction function. It remains true to say that there is a strict maximum transaction amount imposed by the automated trading system operating in this second manner because any oversize Order Message if executed entirely, is executed in at least two separate transactions. No single transaction is executed for an amount above the maximum transaction value of the trading system.

Credit Management System

A credit management system may be provided as an integral part of the market view generator 28. The task of the credit management system is to customise Market User Views. To do so it maintains bi-lateral authorisation information between market maker and market user counterparties. Using a credit management system, the Market User Views may be made to reflect prices at which the market user is able to trade.

Any number of market users may be interested in selling to or buying from a market maker at the quote price specified in the Price Message. Whilst a particular market maker may be prepared to deal with a particular market user he may impose a limit on the value of their transactions to limit his exposure with that market user or he may not be prepared to deal with that market user at all. Similarly, market users may wish to limit the value of their transactions with a particular market maker or to avoid dealing with a particular market maker. In order to establish an efficient automated trading system, details of the circumstances under which market makers and market users are prepared to deal with each other must be stored and updated.

U.S. Pat. No. 5,375,055 teaches credit management for an electronic brokerage system. Its teaching is incorporated herein by reference. In particular, U.S. Pat. No. 5,375,055 teaches credit limit administration means for automatically determining whether a predetermined level of credit is currently respectively available between two parties and dealable price processing means responsive to price quotation messages as well as to the credit limit administration processing means for automatically transmitting dealable price messages to terminals of at least one party. The Dealable Price messages are derived only from price quotation messages from those parties for which the credit limit administration means has determined that the predetermined level of credit is currently available on a bilateral basis both from and to the particular party.

Preferably a restricted version of the credit management system of U.S. Pat. No. 5,375,055 is used in the automated trading system 2. In the context of the present invention, the price quotation messages described in U.S. Pat. No. 5,375,055 are Quote Messages (whether automatically or manually generated). If the credit management system of U.S. Pat. No. 5,375,055 is used, it is preferably restricted to prevent automatch between two market makers. Market users may wish to sell currency or buy currency and theoretically it would be possible for two market users to execute a transaction meeting both their requirements. However, this is prevented in the automated trading system of the present invention. Market users are not permitted to submit Price Messages quoting prices and direct transactions between market users are, therefore, prevented. Thus, matching can only occur between a market user and a market maker.

When the credit management system is used, each Dealable Price and all entries in an Executable Price List represent the best price or all the prices respectively available to the particular market user at that time for a particular transaction taking into account counterparty credit limitations. It may, therefore, not represent the best price covered by the system.

General Operation of the Automated Trading System

Figure 5A:
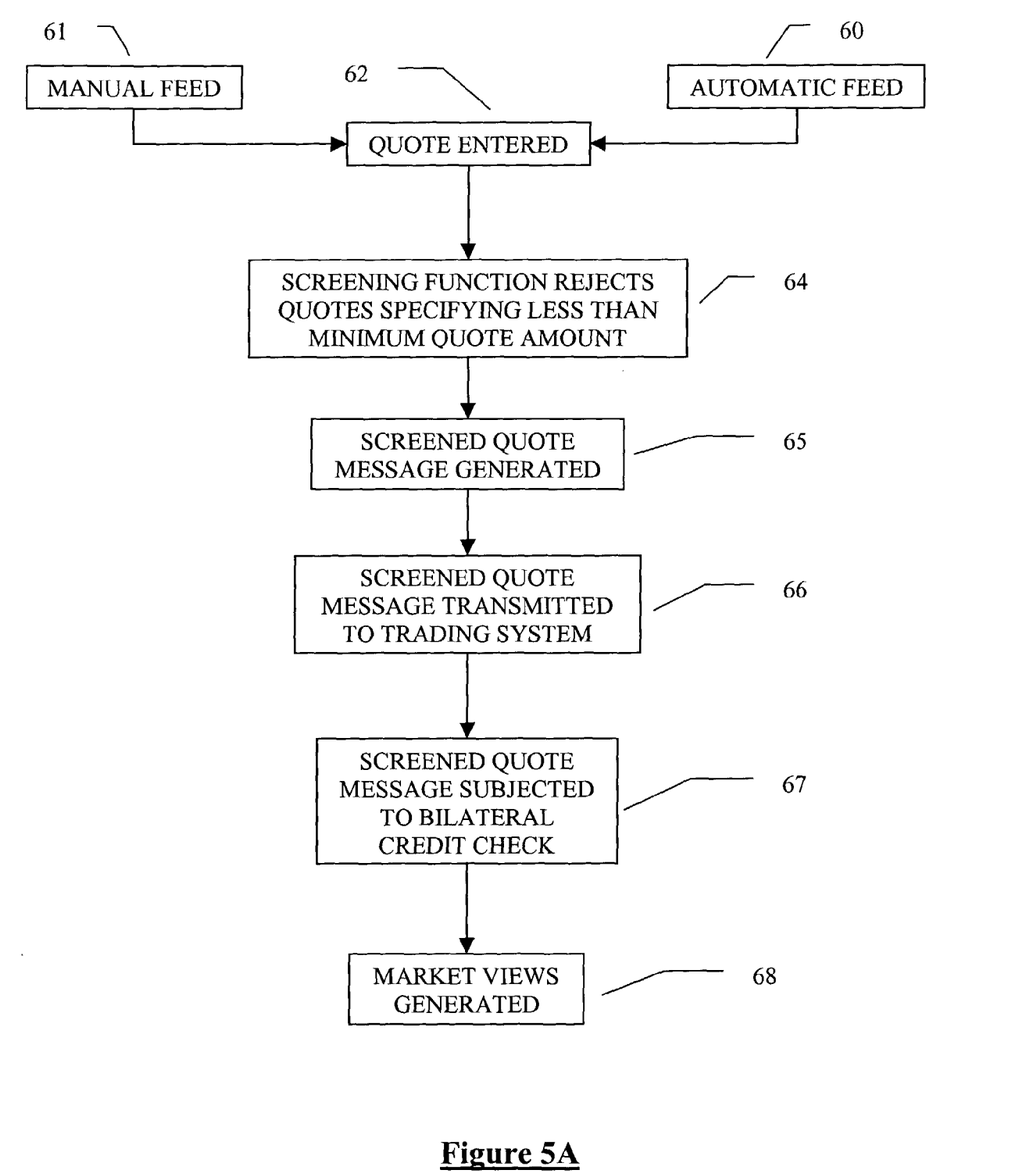
FIGS. 5a & 5b are flow charts showing the functions performed by the automated trading system during a transaction.

The general operation of the automated trading system will now be described with reference to the flowcharts of FIG. 5a and FIG. 5b. FIG. 5a shows the process of quote submission and 5b shows the process of quote and order matching and the flow of information required for the automated trading system to operate and culminate in execution of a transaction.

In FIG. 5a, the screening function may receive quotes at 62 both manual quotes at 61 and Automatic Quotes at 60 generated automatically from feeds but customised according to a market maker=s requirements. Quotes which specify an amount which is less than the minimum quote amount of the automated trading system are rejected at 64 and the remaining screened quotes converted to Quote Messages at 65 and are subjected to credit management at 66. When the amount specified in a market maker=s Quote Message falls below the minimum quote amount, the Quote Message is automatically removed from the system regardless of the size of the transaction which caused the removal. This encourages market makers to specify a higher amount in their Quote Messages to ensure persistence of quote. Market makers may set a default amount which all Quote Messages will specify unless an override is detected by the automated trading system. The minimum value allowed is set at or above the maximum value for transactions and it is preferable that market makers are not able to override this minimum.

Bilateral credit between the market maker and market user counterparties is monitored at 67. Market User Views are generated 68 from Quote Messages originating from market makers with whom the market user has sufficient credit to trade and is authorised to trade. Each customised Market User View is communicated to the appropriate market user.

Figure 5B:
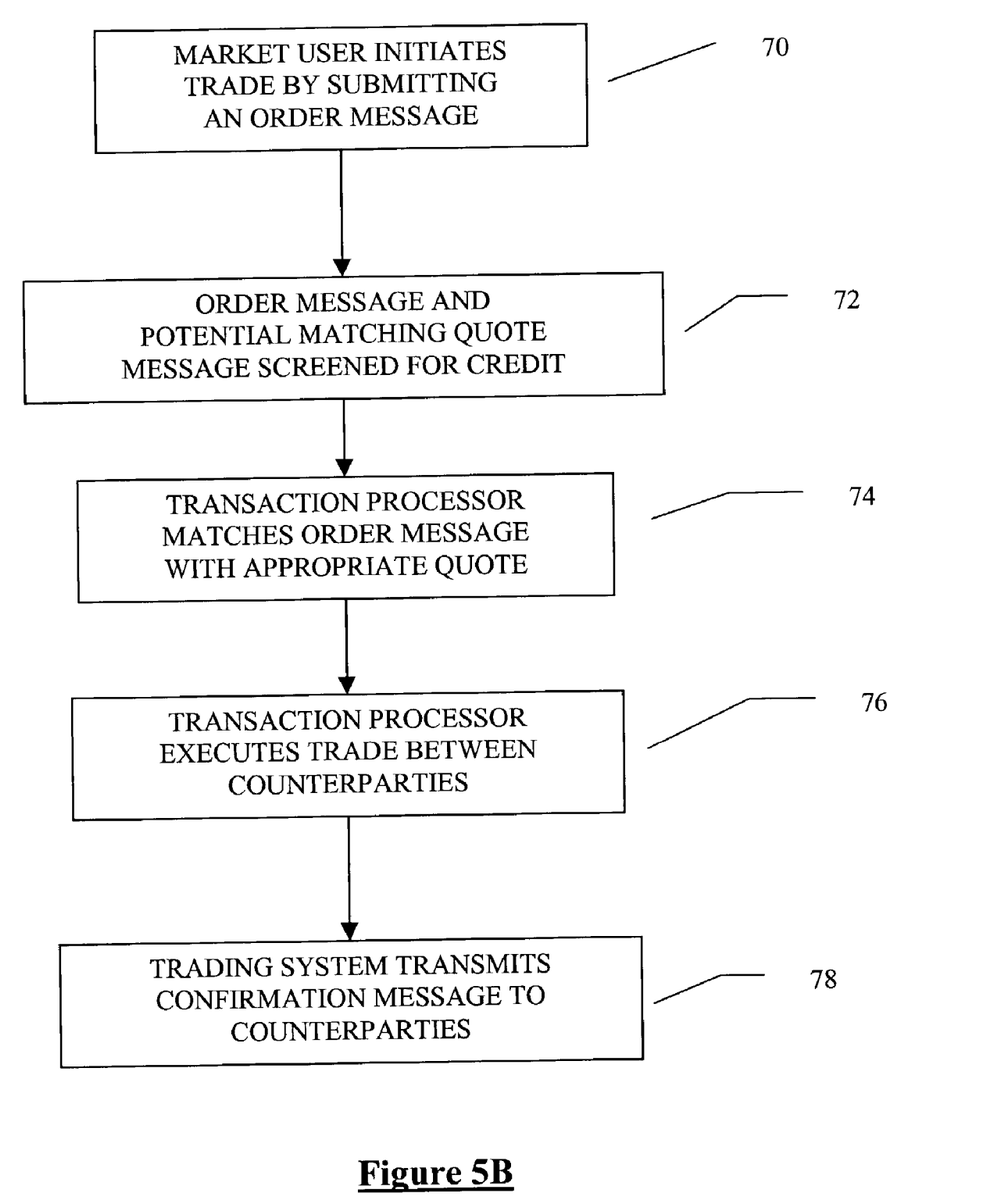

In FIG. 5b a Dealer at a market user workstation may view the price or prices detailed in the appropriate Market User Views. When a Dealer at a market user wishes to execute a transaction he submits an Order Message at 70 specifying the amount of the transaction and enough details of the Quote Message whose quote price he is viewing to identify a relevant Quote Message. If the market user is viewing a Dealable price theoretically the price may be offered by more than one market maker. If this is the case, the Order Message is matched with the Quote Message having the highest priority generated by a market maker with whom the market user has adequate bilateral credit screened at 72. If the market user is viewing an Executable Price List, the Order Message will identify the particular market maker whose price he wishes to take and any matching will be constrained to that market maker=s Quote Message.

The Order Message 70 is received by the transaction function 30 and is matched by the automated trading system to the Quote Message of the market maker whose price was selected at 74. The automated trading system may perform some additional credit screening at 72 and, assuming that everything is in order, executes the transaction at 76. A Transaction Confirmation Message is sent to both the market maker and market user counterparties at 78.

Dealers at both market maker and market user subscribers need to be able to view the day=s transactions. As the automated trading system executes a trade between a market maker and a market user it transmits a Transaction Confirmation Message over the network to the market maker and market user broker nodes. The details of the trade contained in the Transaction Confirmation Message may be displayed at market maker and market user workstations in a Dynamic Transaction Summary (DTS) to show a dealer monitoring trading that a transaction has been executed. The DTS may be displayed in real time for each currency pair being traded. The amount transacted that day or over a particular period specified by the dealer may be displayed by instrument/currency pair.

Advanced Features

To make the automated trading system a level playing field, account may be taken of the physical locations of the various market users and market makers. Market users physically close to a particular market maker will otherwise receive Market User Views containing more recent Quote Messages which are, at that time, un-available to more remote market users leading to the closer market users being party to the most favourable transactions.

The automated trading system may provide an alarm function. Various alarm systems are envisaged. Market makers may instruct the automated trading system of a number of circumstances about which the market maker wishes to be alerted. For example, a market maker may opt to be alerted with a first level warning if the value of transactions executed that day reaches a certain level or the general price for a currency pair estimated by the smalls pricing unit moves a set number of pips in a specified time. A second level warning, accompanied by the market maker Quote Message being removed from the automated trading system, may also be provided. First and second level warnings for each currency pair and/or for all transactions would be configurable by the market maker. The alarm may be set to function when the total daily number of trades executed on behalf of the market maker for each currency pair is exceeded or when the total trade volume across all currency pairs is reached. Other warnings may be based on the value or volume of executed transactions.

Generally a first level warning will sound an audible alert and a second level warning will suspend at least one type of transaction according to the type of alert. The market maker will be able to reset the running total counters associated with each warning or to reconfigure the first and second warning levels at any time.

The automated trading system may also operate a number of security measures. For example, it may require a market maker workstation to transmit an acknowledgement every X minutes if the market maker Quote Message is to remain within the automated trading system. If a dealer at the market maker workstation does not react to a prompt or has not hit a key within the X minutes, a security alert signal may be transmitted from the market maker workstation to the automated trading system which may remove the market maker=s Quote Message and notify the market maker via a security acknowledgement signal sent to the market maker workstation. This security measure can be particularly useful to prevent trading continuing after all the dealers at the market maker have left the trading floor, for example overnight.

If market user and market maker workstations are configured with the same basic functionality, the subscriber category (e.g. market user only, market maker only or both market maker and market user) is used by the automated trading system to override bid and offer keys (for market users only) and buy and sell keys (for market makers only) on the workstation.

The liquidity offered by automatic feeds setting the price in Quote Messages for market makers minimises dealer intervention. It offers a market maker the means to extend dealing efficiently to include weaker currency pairs.

Numerous modifications and changes to the automated trading system as described above will readily occur to those skilled in the art. It is not desired to limit the invention to the exact construction and operation shown and described.

The smalls pricing engine 26 may be housed centrally in the automated trading system 22 rather than distributed over the network at each Broker node. Similarly, credit management may be hosted by the service provider or partially or wholly distributed between Broker Nodes. The automated trading system may be configured to minimise the amount of information a Dealer at a market user must enter into the system to initiate a transaction. For example, the system may create a default amount for a transaction based on the value of the previous transaction which the Dealer would need to override if he wished to specify a different amount for the new transaction. The Dealer would preferably be alerted that a default value was being used.

Customised Market User Views may be transmitted regardless of whether or not a market user has an active session open. Alternatively, the automated trading system may continuously monitor which market users are logged on at any given time and only transmit Market User Views for those market users who are logged on. The automated trading system may automatically cease transmission of Market User Views at the end of a market user defined trading day.

A minimum credit level between market maker and market user counterparties may be imposed by the automated trading system. Typically, for an automated trading system where the maximum value of a single transaction is set at 1 million units, the minimum credit level would be 50,000 units. Provision for setting this minimum credit level, and/or the maximum transaction value, respective to the most expensive currency available for trade by the system, may be made. Any such provision would not prevent market maker or market user subscribers from indicating to the automated trading system that they refuse to deal with a particular party.

The invention claimed is:

1. A method of operating a computer trading system including one or more computers on a network to match instruments between counterparties in which quotes from one or more market makers to bid or offer instruments are matched with orders from one or more market users to buy or sell instruments, comprising:

at least one of the one or more computers receiving quotes from the one or more market makers, each quote specifying a quote amount and a price;

at least one of the one or more computers screening, to identify, from the received quotes, quotes specifying an amount greater than a predetermined minimum quote amount, and producing, from the screened quotes, screened quote messages;

at least one of the one or more computers storing screened quote messages in a quote available store;

at least one of the one or more computers generating and distributing market views from the screened quote messages;

at least one of the one or more computers receiving orders from the one or more market users, the orders having been submitted in response to the distributed market views, each order specifying an amount and a price;

at least one of the one or more computers screening the received orders so as to produce screened order messages comprising only those received orders specifying an amount less than a predetermined maximum transaction amount, said screening of the received orders comprising segmenting an order specifying an amount greater than the maximum order amount into a first reduced value order specifying an amount which is less than the maximum order amount to produce a screened order message and at least a second reduced value order, and rejecting the second reduced value order; and at least one of the one or more computers matching screened order messages with appropriate screened quote messages;

at least one of the one or more computers decrementing the amount specified in a given screened quote message in the quote available store each time a screened order message is matched therewith;

at least one of the one or more computers removing the given screened quote message from the quote available store when the amount specified in that given screen quote message falls below the minimum quote amount;

wherein the predetermined minimum quote amount is set to be equal to or greater than the predetermined maximum transaction amount, such that a screened order message can always be matched wholly with a single screened quote message.

2. A method according to claim 1, wherein the order screening rejects orders specifying an amount greater than the maximum transaction amount.

3. A method according to claim 1, wherein the matching of screened order messages comprises matching the screened order message derived from the first reduced value order with an appropriate screened quote message.

4. A method according to claim 3, wherein the matching of screened order messages matches the at least second reduced value order with the same appropriate screened quote message.

5. A method according to claim 1, wherein matching of screened order messages comprises matching order messages only with those quote messages stored in the quote available store.

6. A method according to claim 1, wherein the computer trading system comprises a plurality of trader terminals and a separate trading system, the screening of quotes being performed, at least in part, on each of the plurality of trader terminals whereby quotes specifying an amount less than the minimum quote amount are not transmitted to the trading system.

7. A method according to claim 1, wherein the computer trading system comprises a plurality of trader terminals and a separate trading system, the screening of quotes being performed, at least in part, on the separate trading system such that quotes specifying an amount less than the minimum quote amount are removed from the quote available store in the trading system.

8. A computer readable storage medium having stored thereon program code which, when executed on a computer trading system for matching instruments between counterparties in which quotes from one or more market makers to bid or offer instruments are matched with orders from one or more market users to buy or sell instruments, performs the steps of:
receiving quotes from the one or more market makers, each quote specifying a quote amount and a price;
screening, to identify, from the received quotes, quotes specifying an amount greater than a predetermined minimum quote amount, and producing, from the screened quotes, screened quote messages;
storing screened quote messages in a quote available store;
generating and distributing market views from the screened quote messages;
receiving orders from the one or more market users, the orders having been submitted in response to the distributed market views, each order specifying an amount and a price;
screening the received orders to as to produce screened order messages comprising only those received orders specifying an amount less than a predetermined maximum transaction amount, said screening of the received orders comprising segmenting an order specifying an amount greater than the maximum order amount into a first reduced value order specifying an amount which is less than the maximum order amount to produce a screened order message and at least a second reduced value order, and rejecting the second reduced value order; and
matching screened order messages with appropriate screened quote messages;
decrementing the amount specified in a given screened quote message in the quote available store each time a screened order message is matched therewith;
removing the given screened quote message from the quote available store when the amount specified in that given screened quote message falls below the minimum quote amount;
wherein the predetermined minimum quote amount is set to be equal to or greater than the predetermined maximum transaction amount, such that a screened order message can always be matched wholly with a single screened quote message.

9. A computer readable storage medium having stored thereon program code which, when executed on a computer trading system for matching instruments between counterparties in which quotes from one or more market makers to bid or offer instruments are matched with orders from one or more market users to buy or sell instruments, performs the steps of:
receiving quotes from the one or more market makers, each quote specifying a quote amount and a price;
screening, to identify, from the received quotes, quotes specifying an amount greater than a predetermined minimum quote amount, and producing, from the screened quotes, screened quote messages;
generating and distributing market views from the screened quote messages;
receiving orders from the one or more market users, the orders having been submitted in response to the distributed market views, each order specifying an amount and a price;
screening the received orders to as to produce screened order messages comprising only those received orders specifying an amount less than a predetermined maximum transaction amount, said screening of the received orders comprising segmenting an order specifying an amount greater than the maximum order amount into a first reduced value order specifying an amount which is less than the maximum order amount to produce a screened order message and at least a second reduced value order; and rejecting the second reduced value order; and
matching screened order messages with appropriate screened quote messages;
modifying each screened quote message when an order message is matched therewith by decrementing the amount specified in each screened quote message; and removing each screened quote message from the market views when the amount specified in each screened quote message is less than the minimum quote amount,
wherein the predetermined minimum quote amount is set to be equal to or greater than the predetermined maximum transaction amount, such that a screened order message can always be matched wholly with a single screened quote message.

10. A method of operating a computer trading system including one or more computers on a network to match instruments between counterparties in which quotes from one or more market makers to bid or offer instruments are matched with orders from one or more market users to buy or sell instruments, comprising:
at least one of the one or more computers receiving quotes from the one or more market makers, each quote specifying a quote amount and a price;
at least one of the one or more computers screening, to identify, from the received quotes, quotes specifying an amount greater than a predetermined minimum quote amount, and producing, from the screened quotes, screened quote messages;
at least one of the one or more computers generating and distributing market views from the screened quote messages;
at least one of the one or more computers receiving orders from the one or more market users, the orders having been submitted in response to the distributed market views, each order specifying an amount and a price;
at least one of the one or more computers screening the received orders so as to produce screened order messages comprising only those received orders specifying an amount less than a predetermined maximum transaction amount, said screening of the received orders comprising segmenting an order specifying an amount greater than the maximum order amount into a first reduced value order specifying an amount which is less than the maximum order amount to produce a screened order message and at least a second reduced value order, and rejecting the second reduced value order; and at least one of the one or more computers matching screened order messages with appropriate screened quote messages;

at least one of the one or more computers modifying each screened quote message when an order message is matched therewith by decrementing the amount specified in each screened quote message;

and at least one of the one or more computers removing each screened quote message from the market views when the amounts specified in each screened quote message is less than the minimum quote amount, wherein the predetermined minimum quote amount is set to be equal to or greater than the predetermined maximum transaction amount, such that a screened order message can always be matched wholly with a single screened quote message.

* * * * *